United States Patent [19]
Ciaramella

[11] 4,117,974
[45] Oct. 3, 1978

[54] DEVICE FOR AUTOMATICALLY LOADING THE CENTRAL MEMORY OF ELECTRONIC PROCESSORS

[75] Inventor: Alberto Ciaramella, Rivoli (Turin), Italy

[73] Assignee: CSELT - Centro Studi e Laboratori Telecomunicazioni S.p.A., Turin, Italy

[21] Appl. No.: 753,780

[22] Filed: Dec. 23, 1976

[30] Foreign Application Priority Data

Dec. 24, 1975 [IT] Italy ............................ 70182 A/75

[51] Int. Cl.² ..................... G06F 11/00; G11C 29/00
[52] U.S. Cl. ..................... 235/304; 235/312
[58] Field of Search ............ 235/153 AK, 304, 312; 364/200, 900

[56] References Cited

U.S. PATENT DOCUMENTS

| | | | |
|---|---|---|---|
| 3,281,792 | 10/1966 | Raymond | 364/200 |
| 3,911,400 | 10/1975 | Levy et al. | 364/200 |
| 3,911,402 | 10/1975 | McLean et al. | 235/153 AK |
| 3,916,384 | 10/1975 | Fleming et al. | 364/200 |
| 3,962,684 | 6/1976 | Caudel et al. | 364/200 |
| 3,988,714 | 1/1976 | Bardotti | 235/153 AK |
| 3,999,163 | 12/1976 | Levy et al. | 364/200 |

*Primary Examiner*—Charles E. Atkinson
*Attorney, Agent, or Firm*—Karl F. Ross

[57] ABSTRACT

An electronic data processor includes a computing unit CPU carrying out a main program on the basis of data stored in a central memory MC and transferred to it from a mass memory MM under the control of an ancillary program or "bootstrap" prerecorded in an external unit UE. The latter comprises a read-only memory RP storing the ancillary program, another read-only memory RM containing a set of microinstructions sequentially read out under the control of an address counter CRM to carry out the word-by-word transfer of the ancillary program to the central memory MC, and various components LCM, LSA, CFD for checking the correct performance of these operations and halting the transfer in the event of a malfunction while emitting an alarm signal.

10 Claims, 4 Drawing Figures

DEVICE FOR AUTOMATICALLY LOADING THE CENTRAL MEMORY OF ELECTRONIC PROCESSORS

FIELD OF THE INVENTION

The present invention relates to electronic processors, and more particularly to a device able to automatically load a data-transfer program and operative programs from a mass memory to a central memory of such processors.

BACKGROUND OF THE INVENTION

It is known to provide electronic processors with a central memory and a mass memory, allowing programs to be carried out only if they are recorded in the central memory. Besides, while in the mass memory programs are recorded in a permanent way, in the central memory they may be missing or be destroyed for many reasons. For instance, programs must be introduced into the central memory when a computing system is used for the first time; if the memory is made of semiconductors, it must be loaded again every time after the processor has been cut off. If the memory is of a different structure, consisting, for instance of magnetic cores, the memory is to be loaded again after a stop occurred because of an error or a failure.

Transfer of main programs from the mass memory to the central memory is controlled by an instruction sent to the mass memory by the processing devices; yet this instruction is in turn an ancillary program (named "bootstrap" in the art) that the central memory shall send to the processing devices. This "bootstrap" program comprises, besides the actual transfer command, also the check of the final correctness of the transferred information. It is consequently a rather complex program and cannot be loaded manually into the central memory, but must be permanently recorded somewhere, for instance in a read-only memory.

This read-only memory in some very sophisticated processors is directly inserted into the computing system and its controlled by a pushbutton placed on the console.

The unquestionable operative advantage offered by such a solution is counterbalanced by the fact that the "bootstrap" must be dealt with in the overall design of the computing unit, aside from the problem that the computing unit itself is encumbered by a device which can be useful only in some cases. In some processors of a different kind the "bootstrap" is added to the central memory. This entails an encumbrance and greater costs for the central memory, as in the "bootstrap" some functions may exist which are not necessary to the transfer to be carried out and which lenghten the program. Besides, the type of encoding by which this ancillary program is recorded is generally, not a natural coding, that is it does not allow the optimum utilization of the processor code (for instance the use of sub-routines).

In the more usual processors, on the other hand the "bootstrap" is recorded in an external unit which can be either a tape or a card and it must be transferred into the central memory in order to be implemented by the processor.

There are some types of processors in which such a transfer operation from the external unit is controlled by a special circuit inserted in the operative unit of the processor. In other types of processors this circuit does not exist; in these cases it is necessary to prerecord a short program for loading into the central memory the contents of the external unit and make it operational. Recording of this program is generally carried out manually by means of suitable control devices placed on the console of the operative unit. Yet possible errors may affect these operations, and the need arises that the program be as short as possible; but if it is too short, it means that it does not sufficiently control the operation of transfer from the external unit to the loading area. Also, the external unit generally contains a relatively short program in which there are no particular checking operations and redundancies. These circumstances may cause errors which will be detected only when the "bootstrap" becomes operative, entailing disadvantages which are well known to the skilled in the art.

OBJECTS OF THE INVENTION

The general object of my invention is to provide an improved storage device which may be applied to any processor not equipped with means for automatically loading ancillary programs for starting the transfer from a mass memory to a central memory and which offers the possibility of using an external unit characterized by simple construction, easy maintenance, high reliability, large capacity, and ability to accept the necessary checks and redundancies.

It is a further object of the present invention to provide a device of this type, not tied to the usual operation of the processing system which, acts in an autonomous way and is consequently more reliable.

It is another object of the present invention to provide a device for the storage of an ancillary program which is not manually operated but is initiated simply by pressing a pushbutton on an external unit.

Yet a further object of the invention is to provide a program-storing device that does not encumber the central memory with components used only intermittently, utilizing an external memory able to store instructions as complex as desired, affording all necessary checks and redundancies, and facilitating recording by the usual programming methods.

It is still another object of the present invention that the device have means able to check the proper preliminary operation of the processing unit.

SUMMARY OF THE INVENTION

In accordance with my present invention there is provided, in an electronic data-processing system of the type referred to, an external unit independent of the computing and memory sections of that system, this unit comprising storage means containing an ancillary program ("bootstrap") to control the introduction of data from the mass memory into the central memory of the processor. The unit further comprises operating means connected to the storage means for carrying out a transfer of all or part of this ancillary program to a central memory in response to a starting command, given for example by the depression of a pushbutton. Finally, the unit also includes check means connected to the operating means for verifying the correct performance of the transfer and halting same upon detecting a malfunction, advantageously with simultaneous emission of an alarm signal to alert an operator.

According to a more particular feature of my invention, the storage means of the external unit includes a first read-only memory containing the ancillary program which comprises a series of words to be successively read out to the central memory of the processor upon being identified by an associated first address counter. Included in the operating means is a second read-only memory containing a set of microinstructions, to be successively read out under the control of a second address counter, and logical circuitry connected to this second memory and to the aforementioned check means for advancing the two address counters in response to the extracted microinstructions and in the absence of a malfunction indication.

BRIEF DESCRIPTION OF THE DRAWING

The above and other features of my invention will now be described in detail with reference to a preferred embodiment illustrated in the accompanying drawing in which.

SPECIFIC DESCRIPTION

Figure 1:
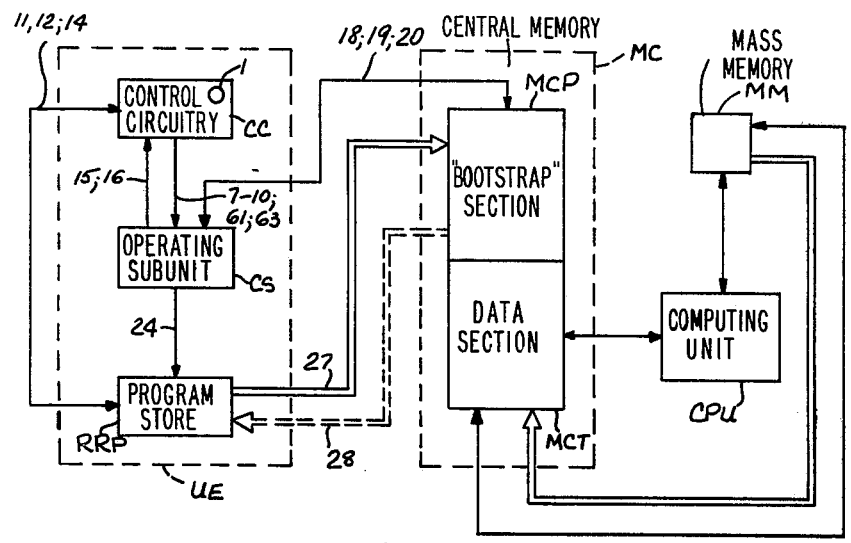
FIG. 1 is a basic outline of a memory system of a processor provided with an external program-storing unit according to my invention.

In FIG. 1 I have shown a computing unit CPU of a processor, which may be of any conventional type, having a mass memory MM and a central memory MC, the latter being here conceptually subdivided into two parts; the first part, designated MCP, denotes the area of the memory designed to be loaded with the ancillary program or "bootstrap"; the second part, designated MCT, denotes the area of the central memory designed to be loaded with data transferred from mass memory MM.

Reference UE denotes an external unit, which is the main feature of the present invention, storing the "bootstrap". Unit UE may be considered subdivided into three sets of circuits or subunits, i.e. a first subunit CC which contains the elements controlling the transfer operations and performing a first level of checks on them; a second subunit by CS, which contains the operative circuits and the circuits which carry out part of a second level of checks on the transfer operations in progress; and a third subunit RRP which stores the ancillary program to be transferred, as well as the circuits completing the second level of checks on the operations performed.

Figure 2:
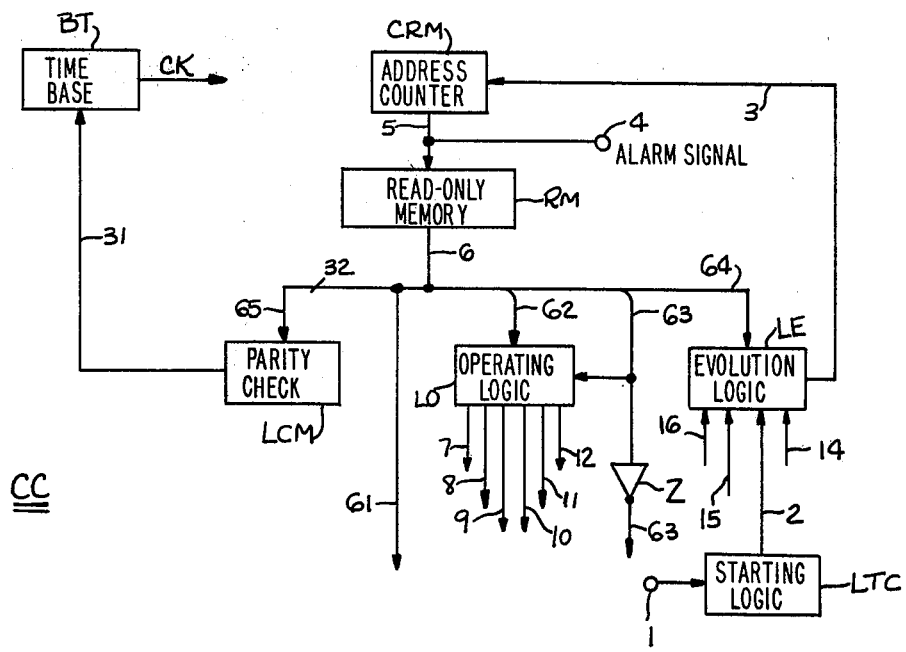
FIG. 2 is a block diagram of a control circuit forming part of the external unit shown in FIG. 1.

In FIG. 2, which shows details of subunit CC, reference BT denotes a conventional time base as required for the regular operation of the system, which can be stopped when the first level of checks gives a negative result.

Reference LTC denotes a conventional starting logic externally controlled by a pushbutton 1. Reference LE denotes a conventional evolution logic for advancing of the operations which, on the basis of the conditioning instructions received from the operative circuitry of subunit CS, steps a counter CRM. The number reached by this counter forms the address for the reading of a read-only memory RM which stores the microprogram controlling the transfer to central memory MC (FIG. 1) of the ancillary program recorded in store RRP; this ancillary program is to be carried out by the computing unit CPU in the transfer of data from mass memory MM to central memory MC.

Read-only memory RM (FIG. 2) is a source of several (e.g. 32) 32-bit words serving either as instructions or as data. The utilized format includes a bit, identifying whether the word acts as a datum or an instruction.

Reference LCM denotes a microprogram-checking logic able to check, by making use of the code redundancies, the exact coding of the microinstruction outgoing from memory RM.

Reference LO denotes an operating logic, able to receive and emit, in response to a signal characterizing an instruction word, the instructions designed to control and time the various operative elements of subunit CS and of program store RRP.

Figure 3:
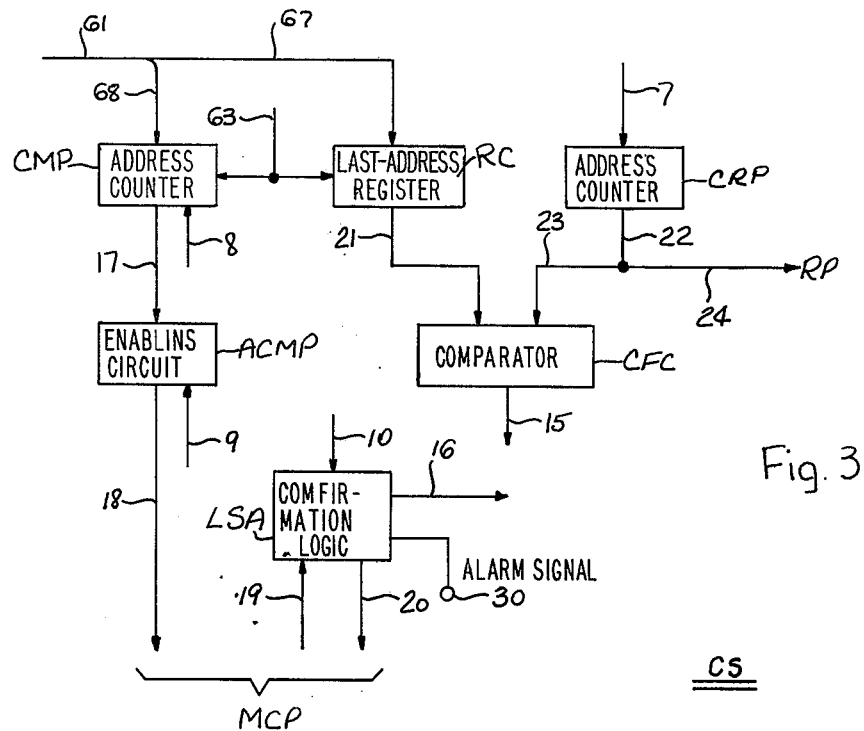
FIG. 3 is a block diagram of the operative part of the external unit shown in FIG. 1.

In FIG. 3, showing details of subunit CS, reference CMP denotes a counter whose reading identifies the location in address of the central memory MC (FIG. 1) which the word transferred from store RRP must enter. Reference ACMP denotes a conventional enabling circuit timing the readout of data from counter CMP.

Reference RC denotes a register designed to hold the address which, in the store RRP (FIG. 1 and 4), corresponds to the last word of the block of instructions to be transferred.

Reference CRP (FIG. 3) denotes a counter able to increment its count by one with every instruction exchanged between components RRP and MCP (FIG. 1). This count represents the address of the location of the program memory contained in store RRP at which the instruction to be transferred is to be read.

Reference CFC (FIG. 3) denotes a conventional comparator which compares the contents of register RC and of counter CRP and emits a signal upon ascertaining their identity.

Reference LSA denotes a logical confirmation network checking the exchanges carried out between the external unit UE (FIG. 1) and the central memory MC of the processor. Logic LSA (FIG. 3) controls word by word, upon command of the microprogram coming from logic LO (FIG. 2), the exchanges with central memory MC and waits for the response. In case of an unsuccessful exchange, it sends an alarm signal to the operator.

Logic circuits for carrying out these operations are well known in the art.

Figure 4:
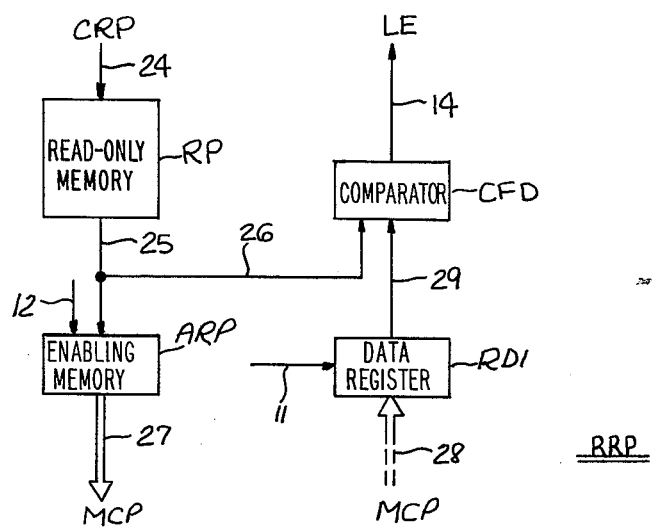
FIG. 4 is a block diagram of a program store included in the external unit shown in FIG. 1.

In FIG. 4, showing details of program store RRP, reference RP denotes a read-only memory containing the ancillary programs to be transferred to central memory MC from which, as already mentioned, the operative unit CPU will extract them in order to transfer data from mass memory MM to central memory MC. Memory RP has a large capacity, compatible with the present technologic limits, able to contain, besides the program, all redundancies allowing the checking of the correctness of the transfer. Memory RP works into a conventional enabling register ARP.

Reference CFD denotes a data comparator, able to compare data received directly from memory RP with data read in the central memory MC of the processor, which reach it through a conventional register RD1. The signal emitted by comparator CFD is received by evolution logic LE (FIG. 2) which in turn controls counter CRM; if the output signal of comparator CFD indicates that the comparison had a negative result, the unit stops and the counter informs the operator of the kind of error just detected.

It may be observed that the operations carried out by unit UE are entirely controlled by logic LO (FIG. 2) from which wires 7-12 convey operative instructions to the counter CMP (FIG. 3), to enabling circuit ACMP associated with this counter, to the final-address register RC, to counter CRP, to the exchange logic LSA, to register ARP (FIG. 4) enabling the readout of memory RP, and finally to register RDI.

The progress of the microprogram controlling the transfer from external unit UE to central memory MC is basically under the control of logic LE receiving signals of successful or unsuccesful operations; these signals are coming from logic LSA (FIG. 3), from comparator CFC and from comparator CFD (FIG. 4) and determine whether or not the counter CRM (FIG. 2) is to advance its count.

The operation of the device will now be described with reference to the drawing.

The actuation of pushbutton 1 (FIGS. 1 and 2) located on the external unit UE starts the corresponding logic LTC, which sends a signal through a conductor 2, to the evolution logic LE causing it to generate a signal which, on a wire 3, places counter CRM in position 1.

At the first timing signal CK outgoing from time base BT, counter CRM emits on a wire 5 the address of the first microinstruction registered in the read-only memory RM. This microinstruction consists of a 32-bit word, goes out on a connection 6 and is split in the following way:

The entire word goes on a 32-wire-connection 65 to logic LCM which, by making use of code redundancies, in the well known manner checks whether the coding is correct. If it is not right, the logic generates a signal on a wire 31 which stops the operation of time base BT, thus arresting the whole circuit. Obviously, this check occurs on each microinstruction, outgoing from memory RM; the first level of checks so carried out; concerns the corrections of the coding of the micropro- gram, registered in memory RM, which controls the transfer of the bootstrap program from external unit UE to central memory MCP.

The 32-bit word outgoing from memory RM may be a data word or an instruction word. If a data word is concerned, it will consist of two conventional parity bits detected by logic circuit LCM, of condition bits which affect the evolution logic LE, and of a discriminating bit characterizing it by its logic level, for instance "0", as a data word. The remaining part of the word carry the actual data to be conveyed via a branch 61 to components CMP (FIG. 3) and RC of downstream subunit CS.

Contemporaneously, the discriminating bit having logic level "0" is conveyed by a wire 63 (FIG. 2) to an inverter Z whose output at logic level "1" enables the setting of counter CMP and register RC (FIG. 3) as will be explained hereinafter.

If the microinstruction read out from memory RM (FIG. 2) is an instruction word, wire 63 will convey a logic level "1" enabling the operating logic LO to receive, on a connection 62, certain instruction bits which are sent through wires 7, 8, 9, 10, 11 and 12 to the subsequent operative circuits. Obviously, only the circuits which will receive a logic "1" will be activated. On wire 63 the logic level "1" will be converted into a "0" by converter Z, thus preventing counter CMP and register RC from receiving the signals.

The bits fed via a connection 64 go to evolution logic LE form a part of the information needed by this logic to generate the signal which steps the counter CRM.

A part of the data bits present on connection 61 are introduced through a connection 68 (FIG. 3) into the counter CMP which, at the beginning of the loading operation, emits on a connection 17 the address of the location in section MCP (FIG. 1) of central memory MC into which the first word of the program contained in read-only memory RP (FIG. 4) is to be transferred.

As the program registered in memory RM (FIG. 2) is advancing, in counter CMP (FIG. 3) the addresses of memory MCP (FIG. 1) are progressively updated; the successive words of the program registered in memory RP (FIG. 4) are transferred to these addresses.

The remaining group of data bits forms the address, in memory RP, of the last instruction to be transferred. This address goes on a connection 67 (FIG. 3) to register RC which introduces it, through a connection 21, into comparator CFC.

The presence of a logic level "1" on wire 7 (FIG. 2) steps the counter CRP (FIG. 3) which thereupon positions itself on the address of the location in memory RP (FIG. 4) where the instruction to be transferred is registered.

This address goes, through connections 22-24 (FIG. 3), to memory RP (FIG. 4) and, through connections 22-23 (FIG. 3), to comparator CFC. When the latter detects the identity between the two addresses supplied by components RC and CRP, it generates a signal on a wire 15 extending to evolution logic LE (FIG. 2) to mark the end of a transfer cycle.

The presence of a logic level "1" on wire 8, connected to a stepping input of counter CMP, causes the incrementation by 1 of the reading of this counter which thereupon addresses the next cell of memory section MCP (FIG. 1). The new address goes, through a connection 17 (FIG. 3), to enabling circuit ACMP which give passage to that address upon being unblocked by a logic level "1" on wire 9. The address so passed reaches memory MCP (FIG. 1) on a connection 18.

The reading command given to read-only memory RP (FIG. 4) by the arrival of an address on a connection 24 causes the readout, on a connection 25, of the word of the program to be transferred to central memory MCP (FIG. 1); this transfer will take place when an enabling pulse coming from logic LO (FIG. 2) on wire 12 has enabled the circuit ARP (FIG. 4) to transfer on connection 27 the word read and from memory RP.

Once a program word is transferred to memory MCP (FIG. 1), a command coming from operative logic LO (FIG. 2) on wire 10 causes logic LSA to generate on a wire 20 (FIG. 3) an order for memory MCP to read the transferred word entered in one of its cells.

This entry arrives on a feedback connection 28 at data register RDI which in turn, in response to a signal generated by logic LO on wire 11, transfers that entry to comparator CFD, where the same word has already been inserted, through a connection 26, during the readout of memory RP.

Comparator CFD signals on an output 14 whether or not the comparison has given a positive result; this signal goes to evolution logic LE (FIG. 2). If the considered signal indicates a negative comparison in component CFD, it causes logic LE to emit a signal on wire 3 which stops the counter CRM associated with microinstructions, CRM.

At the output 5 of counter CRM the address of the last microprogram instruction that has caused the stop will remain indefinitely, and the operator will be alerted by an external signaling means 4. In this way the second check level is realized, which verifies, word by word, the correctness of the transfer from memory RP to memory MCP.

The check of the correct execution of the orders relative to the transfer is the task of logic LSA (FIG. 3), as already mentioned. Through connections 19 and 20, confirmation logic LSA is in continuous communication with central memory MCP: every positive check indicating a successful reading or writing operation, causes the emission on a wire 16 of a signal that, in evolution logic LE (FIG. 2) helps make the decision on the advance of counter CRM. Every negative check, indicating an unsuccessful operation, causes the emission of a signal which activates an external signaling means 30 (FIG. 3).

The aforementioned second check level actually consists of three phases: the first concerns the correct performance of the writing operation and is carried out by logic LSA; the second concerns the correct performance of the reading operations, also and is carried out by logic LSA; the third concerns the correct transfer of instructions contained in memory RP and is carried out by comparator CFD.

To evolution logic LE (FIG. 2) there is also transmitted, on wire 15, the signal generated by comparator CFC (FIG. 3) when it finds an identity between the address, in memory RP, of the last word to be transferred into memory MCP and the position reached by counter CRP associated with program memory RP (FIG. 4). This signal on lead 15 (FIG. 3) denotes the end of the program (or of the part of the program) whose transfer is in progress.

It will be apparent that logic LE (FIG. 2), while receiving the information on the status of a progress of the microprogram recorded in memory RM (connection 64), on the correct performance of the instructions registered in memory RM (wire 16), on the completed transfer of the program (wire 15) and on the correct registration in memory MCP of the program transferred from memory RP (wire 14), monitors at every instant the current state of operations in order to give the proper instructions for the progress of the operative cycle, determined by counter CRM.

Logic LE may be implemented in different ways, in conformity with conventional circuit design.

Briefly, the sequence of steps in the transfer of a single datum from external unit UE to central memory MC is as follows:

(a) unit UE (FIG. 1) presents the datum it wants to transfer and its corresponding address to central memory MC, together with a writing instruction, by exploiting the well-known modality of "memory interruption";

(b) unit UE checks the correctness of the exchange of signals with central memory MC, possibly stopping the evolution of the operation in the presence of an inhibiting signal on lead 16 indicating that the function "writing" has not been performed, and signals a malfunction to the operator (first phase of the second level of check);

(c) unit UE gives the address of the location of the central memory MC it wants to enter, together with an instruction "read" exploiting the aforementioned modality "memory interruption";

(d) unit UE checks the correctness of the exchange of signals with memory MC, and generates another inhibiting signal on lead 16 in the event of nonperformance of the function "read" (second phase of the second level of checks);

(e) unit UE checks the identity of the read datum in memory RP with the corresponding entry in the memory (third phase of the second level of checks) and, in the case of a divergence, generates an inhibiting signal on lead 14.

At the end of the transfer of the whole program recorded in memory RP, unit UE checks again consecutively, with the same modalities as for the readout of the individual words, all the registrations already carried out, so as to be sure of the proper operation of the less significant bits of the address. Thereby virtually the entire addresses are checked, because the most significant bits remain invaried, owing to the relative brevity of the program. In this way the third level of checks is carried out

What we claim is:

1. In an electronic data-processing system including a central memory, computing means for executing a main program on data stored in said central memory, and a mass memory containing data to be selectively introduced into said central memory preparatorily to the execution of said main program,
the combination therewith of an external unit, independent of said computing means, comprising:
storage means containing an ancillary program to control the selective introduction of data from said mass memory into said central memory;
operating means connected to said storage means for carrying out a transfer of at least a part of said ancillary program to said central memory in response to a starting command; and
check means connected to said operating means for verifying the correct performance of said transfer and halting said transfer upon detecting a malfunction.

2. The combination defined in claim 1 wherein said storage means includes a first read-only memory containing said ancillary program, and first counting means connected to said first memory for identifying a series of words of said ancillary program to be successively read out to said central memory; said operating means including a second read-only memory containing a set of microinstructions, second counting means connected to said second memory for identifying the microinstructions to be successively read out therefrom, and logical circuitry connected to said second memory and to said check means for advancing said first and second counting means in response to said microinstructions and in the absence of a malfunction indication.

3. The combination defined in claim 2 wherein said check means comprises a parity-checking circuit connected in parallel with said logical circuitry to said second memory for verifying the correctness of each microinstruction read out therefrom.

4. The combination defined in claim 3 wherein said external unit includes timing means controlling the advance of said second counting means, said parity-checking circuit having an output connection to said timing means for arresting said second counting means upon detecting an incorrect microinstruction.

5. The combination defined in claim 4, further comprising alarm means connected to said second counting means for signaling an arrested condition thereof.

6. The combination defined in claim 2 wherein said check means comprises comparison means with inputs tied to said first memory and via a feedback connection to said central memory for verifying the identity of words read out from said first memory as part of said ancillary program with corresponding entries in said central memory.

7. The combination defined in claim 6 wherein said check means further comprises confirmation means communicating with said central memory for detecting the writing of said entries in said central memory and the readout thereof over said feedback connection.

8. The combination defined in claim 7 wherein said logical circuitry comprises a first and a second logic network with input connections to said second memory, said first logic network having an output connection to said confirmation means for activating same in response to certain microinstructions read out from said second memory, said second logic network having input connections to said comparison means and to said confirmation means and having an output connection to a stepping input to said second counting means for advancing the latter in the absence of an inhibiting signal on either of its said input connections.

9. The combination defined in claim 8 wherein said operating means further includes third counting means connected to said second memory for receiving therefrom the address of a location of said central memory in which a first word from said first memory is to be written, said third counting means having a stepping input connected to an output of said first logic network, said third counting means and said first memory being provided with enabling circuitry controlled by said first logic network.

10. The combination defined in claim 9 wherein said operating means further includes register means connected to said second memory for receiving therefrom the address of a final location of said central memory in which a word from said first memory is to be written, and a comparator with inputs tied to said register means and said first counting means for detecting the end of a transfer cycle, said comparator having an output connection to said second logic network.

* * * * *